United States Patent [19]

Reeves et al.

[11] Patent Number: 4,727,536
[45] Date of Patent: Feb. 23, 1988

[54] VARIABLE CONTROL AND DATA RATES IN HIGHLY EFFICIENT MULTIPLEXER

[75] Inventors: Jonathan M. Reeves, South Meriden; David J. Manning, Waterbury, both of Conn.

[73] Assignee: General Datacomm, Inc., Middlebury, Conn.

[21] Appl. No.: 876,232

[22] Filed: Jun. 19, 1986

[51] Int. Cl.$^4$ .............................................. H04J 3/16
[52] U.S. Cl. ..................................................... 370/84
[58] Field of Search ...................... 370/84, 79, 95, 89

[56] References Cited

U.S. PATENT DOCUMENTS

| | | | |
|---|---|---|---|
| 3,982,074 | 9/1976 | Clark | 370/84 |
| 4,488,293 | 12/1984 | Haussmann et al. | 370/84 |
| 4,658,152 | 4/1987 | Walters | 370/84 |

*Primary Examiner*—Douglas W. Olms
*Assistant Examiner*—James E. Busch
*Attorney, Agent, or Firm*—David P. Gordon

[57] ABSTRACT

Methods and apparatuses for efficiently allocating bandwidth to data, control and multiplexer overhead and for providing flexible data rates and control rates are provided. The apparatuses of the invention are used in a time division miltiplexer which multiplexes for transmission over and for receipt from at least one aggregate line in accord with at least one frame, data and control information from a plurality of channels and multiplexer overhead information. The method comprises: determining the requested data transmission rates for each data channel and the aggregate line; determining the requested control transmission rates for each data channel; summing the total of the requested data transmission rates to produce a second total, summing the first and second totals, determining whether the sum of the first and second total exceeds the determined transmission rate of the aggregate line, decreasing the data rate channel thereby changing the first total to ensure that the aggregate line rate is at least equal to the sum of the first and second total.

28 Claims, 7 Drawing Figures

GENERATE A DATA FRAME

FIG. 4

```
CH#  CHAN   CHAN RT/
     RATE   FRAME RT   FRAME SELECT POSITION COUNTER 1    9600     8      32 24 16  8 32 24 16  8 32 24 16  8 32 24 16  8
2    8400     7      32 25 18 11  4 29 22 15  8  1 26 19 12  5 30 23
3    4800     4      32 28 24 20 16 12  8  4 32 28 24 20 16 12  8  4
4    4800     4      32 28 24 20 16 12  8  4 32 28 24 20 16 12  8  4
5    4800     4      32 28 24 20 16 12  8  4 32 28 24 20 16 12  8  4
6    2400     2      32 30 28 26 24 22 20 18 16 14 12 10  8  6  4  2
SF   2400     2      32 30 28 26 24 22 20 18 16 14 12 10  8  6  4  2
7    1200     1      32 31 30 29 28 27 26 25 24 23 22 21 20 19 18 17

CHOSEN SELECT——▶ 1  2  3  4  1  2  5  6  1  3  2  4  1  5  2 SF 1                   32 24 16  8 32 24 16  8 32 24 16  8 32 24 16  8
2                   16  9  2 27 20 13  6 31 24 17 10  3 28 21 14  7
3                   32 28 24 20 16 12  8  4 32 28 24 20 16 12  8  4
4                   32 28 24 20 16 12  8  4 32 28 24 20 16 12  8  4
5                   32 28 24 20 16 12  8  4 32 28 24 20 16 12  8  4
6                   32 30 28 26 24 22 20 18 16 14 12 10  8  6  4  2
SF                  32 30 28 26 24 22 20 18 16 14 12 10  8  6  4  2
7                   16 15 14 13 12 11 10  9  8  7  6  5  4  3  2  1

CHOSEN SELECT——▶ 1  3  4  2  1  5  6  2  1  3  4  5  1  2  -  7
```

With the SF added to the end, the frame becomes:

|1|2|3|4|1|2|5|6|1|3|2|4|1|5|2|S|1|3|4|2|1|5|6|2|1|3|4|5|1|2|7|S|

If the SF bandwidth required was 1200 and no stealing of bandwidth from channel 2 was required, the frame would be:

|1|2|3|4|1|2|5|6|1|2|3|4|1|2|5|7|1|2|3|4|1|2|5|6|1|2|3|4|1|2|5|S|

Superframe:

```
|1,1|2,1|COM|SYN|1,2|2,2|1,1|2,1|COM|SYN|3,1|1,3| ——▶
|1,1|2,1|COM|SYN|1,2|1,4|1,1|2,1|COM|SYN|2,3|3,2| ——▶
|1,1|2,1|COM|SYN|1,2|2,2|1,1|2,1|COM|SYN|3,1|4,1| ——▶
|1,1|2,1|COM|SYN|1,2|5,1|1,1|2,1|COM|SYN|6,1|7,1|SYN|
```

Frame/Superframe Relationship:

|-F|-F|-F|-F|-F|-F|-F|-F|-F|-F|-F|-F|-F|-F|-F|-F|-F|-F|-F|-F|-F|-F|-F|-F|

|-- -- -- -- -- -- -- -- -- -- -- -- -- -- -- -- -- -- -- -- -- -- -- --|
                        S U P E R F R A M E

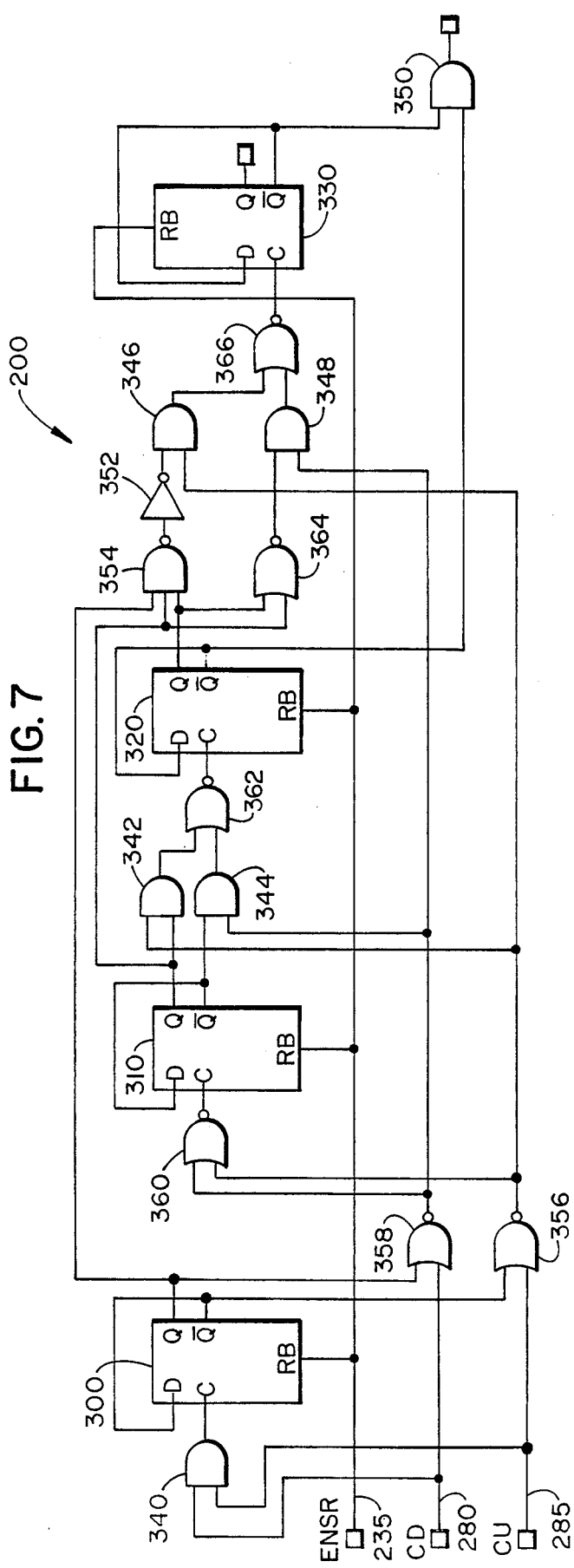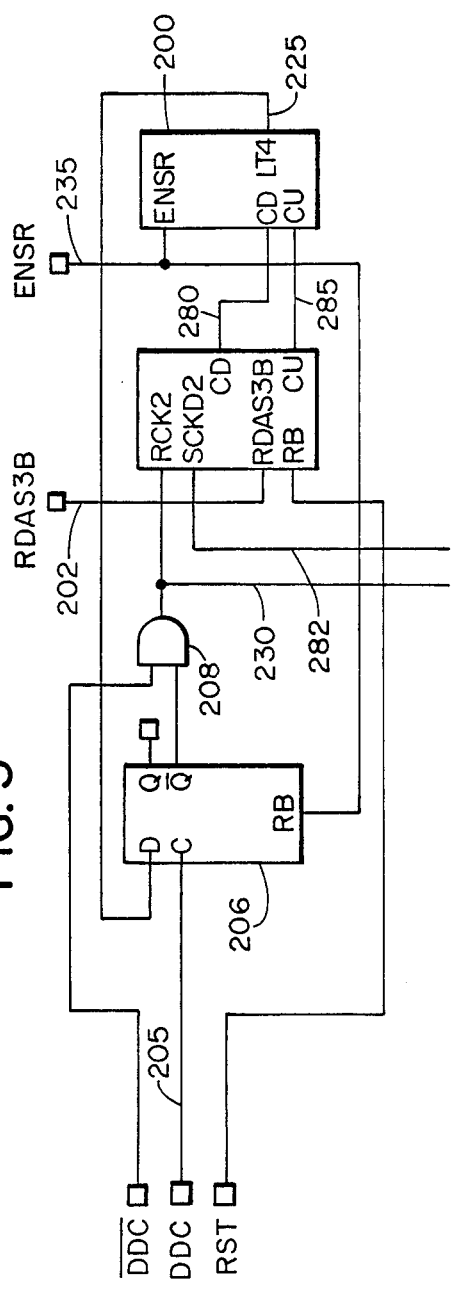
FIG. 7
FIG. 5

FIG. 6
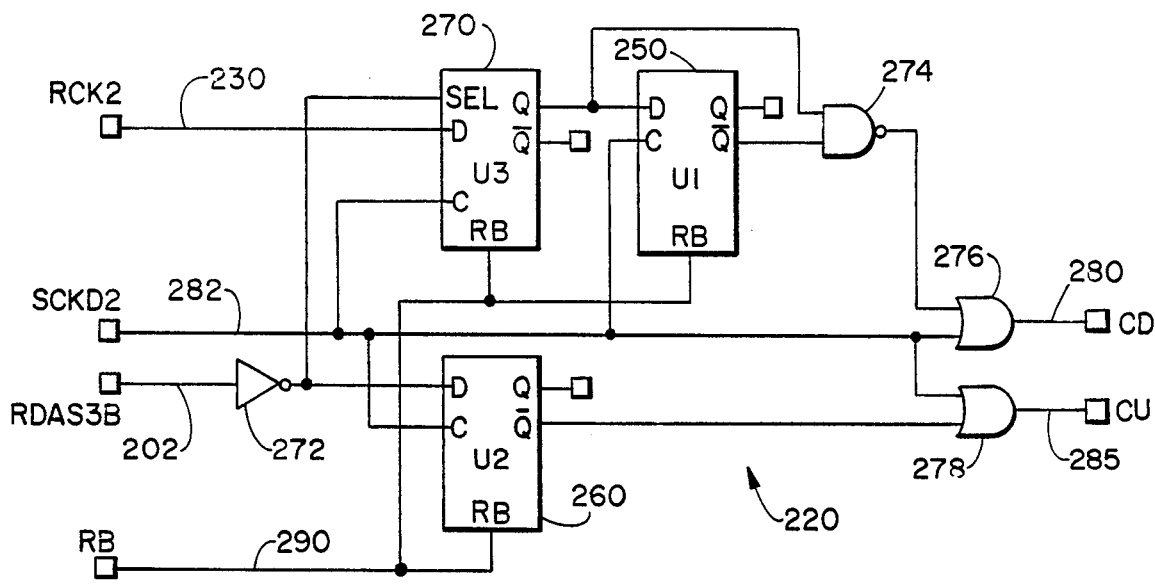
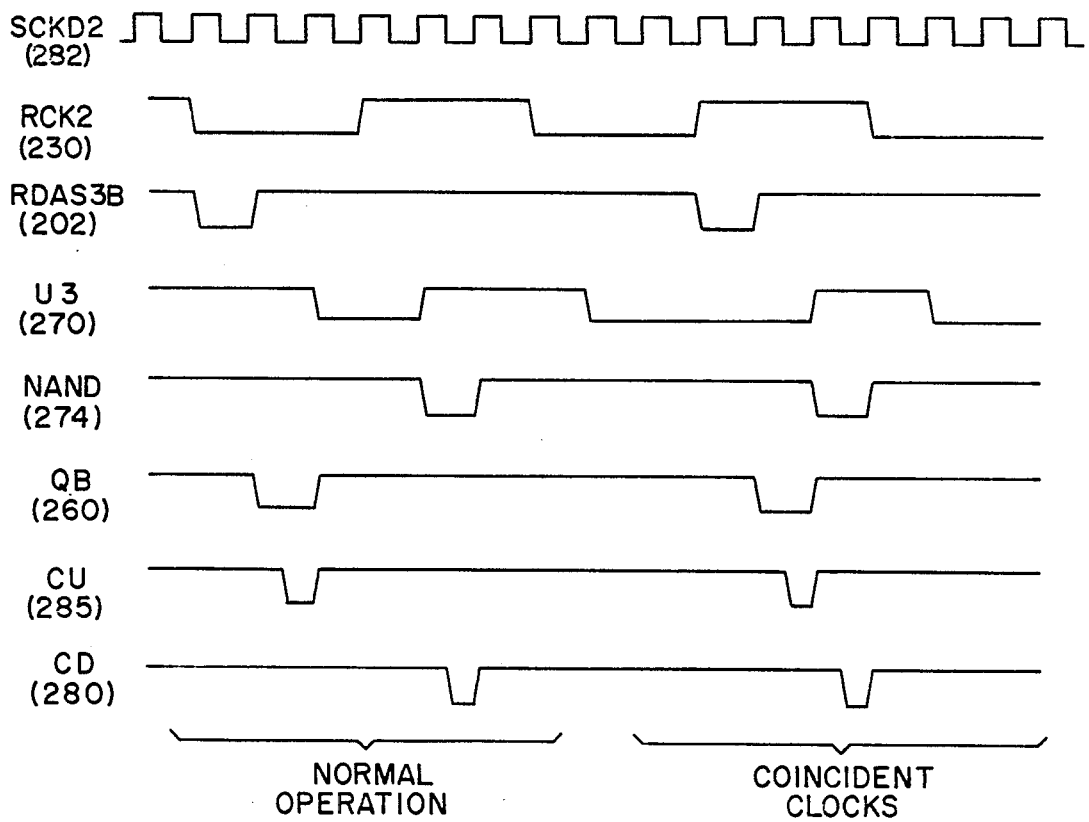
NORMAL OPERATION
COINCIDENT CLOCKS

VARIABLE CONTROL AND DATA RATES IN HIGHLY EFFICIENT MULTIPLEXER

BACKGROUND

This application is related to concurrently filed application Ser. No. 876,229 entitled "Bit Interleaved Multiplexer System Providing Byte Synchronization for Communicating Apparatuses", which is hereby incorporated by reference herein and which is assigned to the assignee herein.

The present invention relates to time-division-multiplexed (TDM) bit interleaved telecommunication systems. More particularly the invention relates to apparatuses and methods for efficiently allocating bandwidth to data, control, synchronization and intermultiplexer communication information, and for providing flexible data rates and control rates with high utilization efficiency.

In a typical TDM system, a transmit frame of a multiplexer samples signals of relatively low frequency from various data sources or channels and interleaves them with one another to form an aggregate data stream that is transmitted by a high speed aggregate channel to the receive frame of a remote demultiplexer. Ordinarily, the TDM transmit frame inserts the signals representative of a single bit or a single character in a single time slot in the aggregate data stream and interleaves the signals from different channels on a bit-by-bit or character-by-character basis so that adjacent time slots contain signals from different channels. At the receive frame, the individual bits or characters are separated from one another and allocated to various low frequency data channels similar to those on the transmit end.

To permit proper TDM communication, prior art systems have the transmit frame interleave the signals from the various data channels in accordance with a fixed schedule (frame) which repeats endlessly and the receive frame uses the same schedule to decode the data stream. In addition to the data signals from the channels, the frame ordinarily interleaves control signals from the channels as well as frame synchronization signals and system control signals. Typically, the synchronization and system control signals are referred to as "overhead" and arranged to take up a small portion of the total frame.

In arranging a frame which permits TDM communication, different framing algorithm schemes have been used. The algorithms are limited by the fact that every channel has to be sampled at least once in every frame and as often as required to ensure that all the data from the channel is interleaved in the aggregate data stream. In addition, a set of overhead signals must be transmitted for each frame, and control signals for the channels may also be included in the TDM communication. Since every channel has to be sampled at least once in every frame, the speed of the slowest channel in the frame determines the maximum number of frames that can be transmitted per unit time without wasting the bandwidth of the aggregate channel. In addition, since the synchronization signals transmitted in each frame are approximately the same regardless of the length of the frame, there is some incentive to use very long frames in order to decrease the overhead and increase data transmission. As a result, the frames tend to be quite along, inflexible, and difficult to configure, and memory of considerable size is required to store the frame.

To simplify the frame configuration, it is has been shown that the data channels may be sampled in a fixed pattern which is repeated numerous times within each frame. Each such cycle of repetition is called a subframe. Likewise, as disclosed in U.S. Pat. No. 4,460,993 to Hampton et al. which is assigned to the assignee herein, a frame can be divided into repeating and nonrepeating portions with the subframe being considered as the repeating portion. In U.S. Pat. No. 4,460,993, a framing algorithm is disclosed which assigns data, control, and overhead "selects" (signals used by a multiplexer to select channels) into repeating and non-repeating sections. Thus, the channel data rates are sorted and ordered by their rates. The greatest common denominator of the data rates is found and called the "frame rate", and the data rate divided by the frame rate determines the number of selects required for each data channel per frame. The aggregate rate divided by the frame rate gives the number of selects required for one frame. A subframe rate is defined by dividing the number of selects required for one frame by five hundred and twelve and rounding up. In assigning locations in the repeating and nonrepeating sections of the frame according to U.S. Pat. No. 4,460,993, the selects required per frame for each data channel are divided by the subframe rate. The integer value obtained determines the number of slots of the subframe (repeating section) that are to be taken by the channel. The remainder of the selects required for the data channel determines the number of slots in the nonrepeating frame portion to be allocated to the channel. System and channel control information is then inserted into remaining slots in the nonrepeating portion of the frame.

While the framing algorithm of U.S. Pat. No. 4,460,993 provided a great improvement in the art in enhancing efficiency, it still suffers from a certain lack of flexibility. Thus, if it is desired that more than a minimum of control information is to be transmitted over the aggregate, but the sum of the data rates plus the minimum controls and overhead rates approaches the aggregate rate, a data channel must be dropped to accommodate the controls. This is in contrast to previous framing schemes which assigned fixed amounts of control and overhead into the frame whether needed or not, thereby limiting the throughput of the data.

SUMMARY OF THE INVENTION

It is therefore an object of the invention to provide apparatuses and methods for efficiently allocating bandwidth to data, control, synchronization and intermultiplexer communication information, and for providing flexible data rates and control rates with high utilization efficiency.

It is a further object of the invention to provide, in a TDM system, means for varying the data rate of a channel to permit an increased channel control rate while maintaining extremely high bandwidth utilization efficiency.

It is yet a further object of the invention to provide a user interactive TDM system which permits flexibility in varying channel control transmission rates.

Yet another object of the invention is to optimize the utilization of bandwidth by claiming for intermultiplexer synchronization and communication overhead substantially all free bandwidth not assigned to data or controls.

At the outset, it should be appreciated that the terms "varying" and "flexible" when applied herein to data and control rates are meant to designate the ability of the system to permit the user to define the desired control rates, and the ability of the system to adjust the requested data rates to accommodate the desired controls. It should be understood that the terms do not indicate the restructuring of a running frame which has been built to accommodate the requested rates. However, any changes in the requested data or control rates can be accommodated by building a new frame according to the teachings of the invention.

In accord with the objects of the invention, an apparatus for efficiently generating select signals which accounts for varying data and control rates is provided in a time division multiplexer which multiplexes data and control signals from a plurality of individual data channels for transmission over an aggregate line. The multiplexer includes a frame means for generating select signals which either select data signals from channels for transmission or which select a superframe, and a superframe means for generating select signals for transmitting control signals from channels and overhead signals from the multiplexer. The apparatus broadly comprises:

(a) means for determining the requested data transmission rates for each of the data channels and an aggregate line;

(b) means for determining the requested control transmission rates for each of said data channels;

(c) summation means for summing the total of said requested data transmission rates to produce a first total, for summing the total of said requested control transmission rates and said overhead signal rates to produce a second total, and for summing said first and second totals;

(d) comparison means for determining whether the sum of said first and second totals exceeds said aggregate line transmission rate;

(e) means for decreasing the data rate allocated to at least one data channel thereby changing said first total, to ensure that said aggregate line transmission rate is at least equal to said sum of said first and second totals; and (f) means for setting the average rate of one of a group of clocks comprising a transmit and a receive clock of at least one of said channels equal to the requested data transmission rates of those channels decreased by rates dictated by said means for decreasing the data rates allocated to said channels.

Preferably, the apparatus further comprises:

(g) memory means; and (h) means for writing selects for channel data and for a superframe into said memory means when said aggregate line transmission rate is at least equal to said third total, wherein the number and order of said selects is a function said second total and of the requested data rates of said channels minus the data rates dictated by said means for decreasing the data rate allocated to said channels.

Also, preferably, the transmit clock of a channel is determined and set by the receive clock. Further, the means for setting the average rate of the receive clocks of the channels to the requested channel rate minus the rate dictated by the means for decreasing the channel data rate preferably comprises:

(1) an up-down counter controlled by a frame and said receive clock, the up-down counter counting up when a select for the channel is received from said frame, and counting down when clock pulses from said receive clock are received; and (2) means for reducing the rate of said receive clock when said up-down counter reaches a lower threshold.

Further, in accord with the objects of the invention, a method for generating select signals is provided in a time division multiplexer which multiplexes data and control signals from a plurality of individual data channels for transmission over an aggregate line and which includes a framing means for generating select signals for transmitting data signals from channels, and a superframe means for generating select signals for transmitting control signals from channels and overhead signals from the multiplexer. The method broadly comprises:

(a) determining the requested data transmission rates for each of said data channels and said aggregate line;

(b) determining the requested control transmission rates for each of said data channels;

(c) summing the total of said requested data transmission rates to produce a first total;

(d) summing the total of said requested control transmission rates and said overhead signal rates to produce a second total;

(e) determining whether the sum of said first and second totals exceeds said aggregate line transmission rate;

(f) decreasing, for at least one data channel, the data rate allocated to said at least one data channel if the sum of said first and second exceeds said aggregate line transmission rate, thereby changing said first total, until said aggregate line transmission rate is at least equal to said sum of said first and second totals; and (g) setting the average rate of one of a group of clocks comprising a transmit and a receive clock of at least one of said channels equal to the requested data transmission rates of those channels decreased by the data rates determined at step (f).

Further objects and advantages of the invention will be more easily understood upon reference to the detailed description of the invention taken in conjunction with the figures.

BRIEF DESCRIPTION OF THE DRAWINGS

FIG. 4 is a chart of the computations performed in generating a hypothetical frame, and a diagram of a hypothetical frame and superframe;

FIG. 5 is a block diagram of the means for setting the average rate of the clocks of the data channels equal to a value less than the requested rate;

FIG. 6 is a block diagram and timing diagram of the up-down coordinator of the means for setting the average rate of a clock of FIG. 5; and FIG. 7 is a block diagram of the up-down counter of the means for setting the average rate of a clock of FIG. 5.

DETAILED DESCRIPTION OF THE PREFERRED EMBODIMENT

Figure 1:
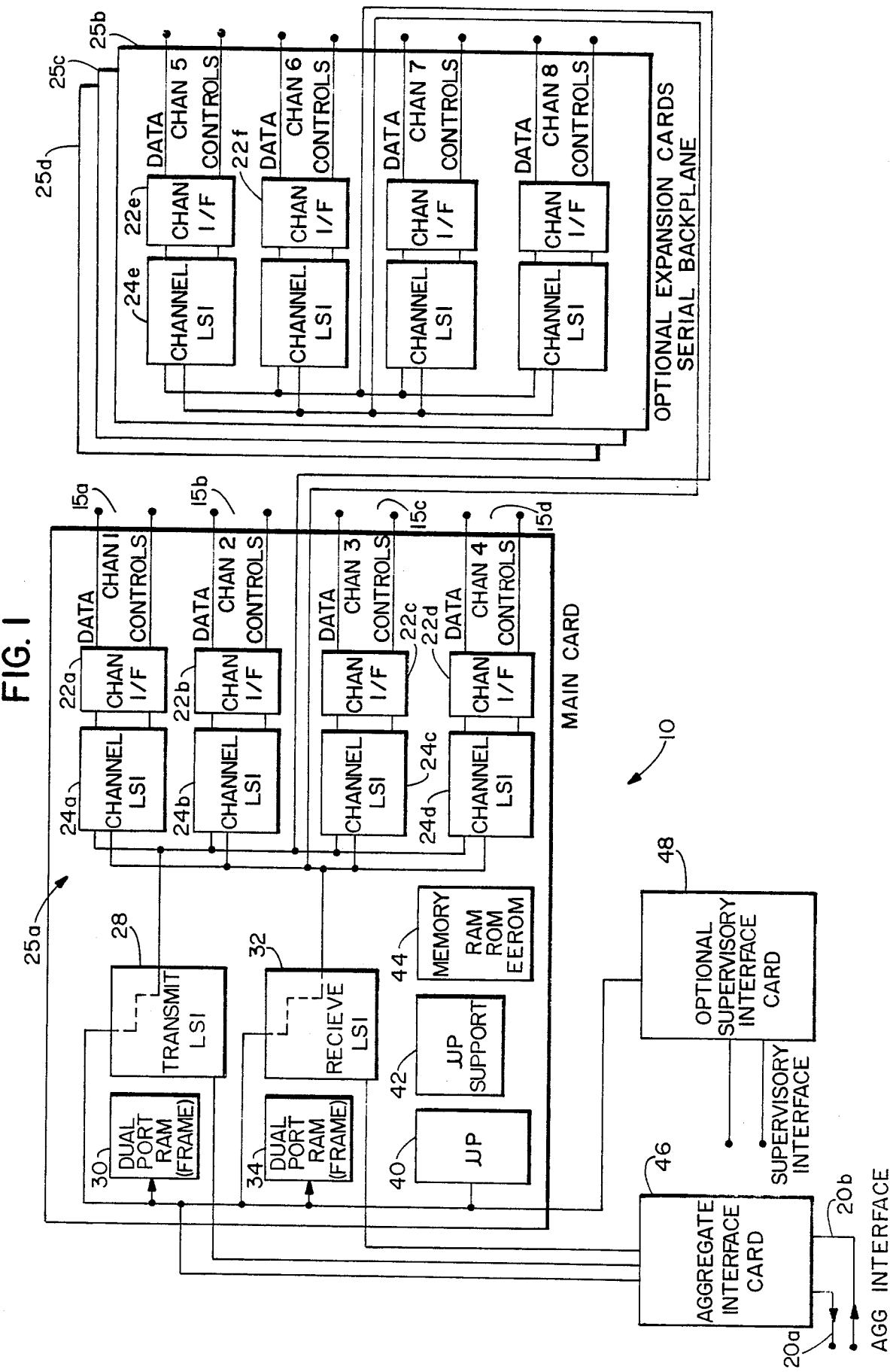
FIG. 1 is a block diagram of a time division multiplexer which includes the apparatus of the invention for efficiently generating selects.

A time division multiplexer/demultiplexer 10 which includes the apparatus invention for generating efficient select signals which account for varying data and contol transmission rates is seen in FIG. 1. The time division multiplexer/demultiplexer 10 (hereinafter referred to as a "multiplexer") generally multiplexes data and control signals from a plurality of individual data channels 15a, 15b, 15c ... as well as intermultiplexer communication and synchronization (hereinafter referred to as "comms" and "sync" and jointly referred to as "multiplexer overhead"), for transmission over an aggregate line 20a. Multiplexer 10 also demultiplexes data, control signals and multiplexer overhead received over aggregate line 20b, and sends the signals to their proper destination.

The various physical blocks of multiplexer 10 are seen in FIG. 1. The multiplexer 10 includes a channel interface 22 and integrated circuit package denoted "channel LSI" 24 for each peripheral (modem, multiplexer, computer, etc.) utilizing multiplexer 10. As indicated in FIG. 1, according to the best mode, multiplexer 10 can support up to sixteen peripherals through the use of three expansion cards 25b, 25c, and 25d which identically include a channel interface 22 and channel LSI 24 for each peripheral, and which can each support four additional peripherals. The multiplexer further includes transmit circuitry 28 with a framing RAM 30, receive circuitry 32 with a framing RAM 34 (RAMs 32 and 34 preferably comprising 8k by 8 bit static RAMs such as the Hitachi 6264), a microprocessor 40 such as a Motorola 6809 replete with microprocessor support circuitry 42 (preferably of the 74HC type) and its own memory 44 (preferably a Hitachi 6264 RAM; Hitachi 27256 ROM; Xicor 2816 EEROM), and an aggregate interface card 46. Optionally, a supervisory interface card 48 is provided to permit control by the user over the system. The supervisory interface 48 preferably provides a "user friendly", menu-based dialogue via an intelligent terminal having x-y cursor addressing.

Because much of the apparatus invention resides in the functions of the microprocessor 40 and the relationship of the microprocessor with the various blocks of the multiplexer 10, it is instructive to review the functioning of the various multiplexer blocks. Multiplexed information, including data, control information, and multiplexer overhead, sent over the aggregate 20b is received at the receive LSI 32 via an aggregate interface card 46 which properly sets voltage levels. The receive LSI 32 preferably includes synchronization circuitry, buffers and clocks as is well known in the art, and a pointer which acts as a recirculating counter. The synchronization circuitry, buffers, and clocks are used to ensure that the multiplexer 10 is in synchronization with the remote multiplexer which is sending it information via aggregate 20b. The pointer is used to address the RAM 34 which is programmed according to a framing algorithm for demultiplexing the information which will be described in detail hereinafter. The information retrieved from the RAM 34 is decoded in the receive LSI 32. If the information is either data or control information for a channel, the receive LSI 32 generates a channel select and sends the data or control information to one of the channel LSI's 24 in accord with the frame.

The channel LSI 24 is comprised of data buffers, mark buffers, input and output pointers, clock circuitry, and means, which will be described in detail hereinafter, for varying the average rate of the receive clock of the accompanying channel. Control information which is received from the receive LSI 32 by the channel LSI 24 is passed directly to the control port of the channel of its destination. However, for data being received in accord with the receive frame, the channel LSI 24 has a receive data buffer for the data and an accompanying mark buffer which is supplied with bits generated by the receive LSI 32 in accord with whether or not the data being received is a most significant bit (MSB). The data is input into the buffers according to the location of the input pointer of the buffer, and is output to the channel according to the receive clock of the channel and the location of the output pointer. A more detailed explanation concerning the buffers, and pointers of channel LSI 24 may be had by reference to copending Serial No. 876,229, previously incorporated by reference herein.

In transmitting data or control information from multiplexer 10 over aggregate 20a, a frame and a superframe must be built, as will be described in detail hereinafter, according to the requirements of the user. Also as explained hereinafter, the requirements of the user will sometimes necessitate the need for varying a channel data rate below a standard rate in order to ensure that control rates as chosen by the user can be accommodated. Such requirements must be built into the circuitry and frame.

The frame, which is stored in RAM 30, includes channel data selects and superframe selects. The superframe, which runs at a slower speed than the frame, and which is also stored in RAM 30, includes selects for channel control information as well as intermultiplexer overhead. Thus, a pointer in the transmit circuitry 28 addresses a location in the RAM 30, which in turn outputs an eight bit code to the transmit circuitry 28. The transmit circuitry decodes the code. The first bit of code is used to indicate whether or not channel data is to be transmitted. If channel data is requested, the next four bits are used to indicate the channel (peripheral) from which the data is requested. Thus, the transmit LSI selects the channel 15 corresponding to the four bit address. In response, data which has been sent by the channel 15 via the channel interface 22 into a buffer in the channel LSI 24 according to teachings of copending patent application Ser. No. 876,229, is sent over the aggregate 20a via the aggregate interface 46. Also, when data is to be transmitted, a sixth bit of the eight bit code of the RAM is used to indicate whether or not the requested bit from the channel is a most significant bit. In response to this sixth bit of code, the transmit circuitry 28 writes a bit of information into a transmit mark buffer of the channel LSI 24 according to a scheme taught in copending patent application Ser. No. 876,229.

If the first bit of the eight bit code of the transmit RAM 30 indicates a superframe select, the remaining bits are ignored. Instead, the transmit LSI updates a second pointer which points to another location in the frame 30 which is particular to the superframe. The RAM 30 then outputs another eight bit code word which is decoded by the transmit LSI 28 to determine whether control information is to be sent, or whether a synchronization or communication bit (overhead) is to be sent. Thus, according to the best mode, if any of the three least significant bits are "0", control information is to be sent. In such a mode, the first four bits provide the address of the channel from which the control information is to be obtained, and the last four bits indicate which control bit (port) is to be transmitted. However, if the three least significant bits are all set to "1", the system is attempting to transmit intermultiplexer communication or synchronization information, and the first five bits have a different meaning. Thus, if the first five bits are "0", it is defined as no operation. If the first bit is set to "1", it indicates the end of a superframe. If the second bit is set to "1", the first or final bit of an intermultiplexer communication byte is indicated. If the fifth bit is set to "1", a communication bit is indicated. Finally, if the fourth and fifth bits are set to "1", a synchronization bit is indicated. It should be appreciated that many different schemes to differentiate between communication, synchronization, and control bits will present themselves to those skilled in the art.

While the functioning of the various multiplexer blocks is described above and in copending patent application Ser. No. 876,229, much of the novelty of the instant invention resides in some particular functions of the microprocessor 40 and the relationship of the microprocessor with the various blocks of the multiplexer 10. In broad terms the microprocessor 40 may be said to have five functions. First, the microprocessor 40 has a control function regarding the multiplexer 10 in that it coordinates multiplexer operation, controls the multiplexer configuration by configuring all programmable hardware, calculates the bandwidths required, and builds sets of frames and superframes for the multiplexer. A second function of the microprocessor it its synchronization function. The microprocessor detects loss of synchronization, and establishes or reestablishes synchronization with a remote multiplexer. The microprocessor also maintains synchronization while switching from a first frame to another frame. A third function of the microprocessor is its user-interface function wherein it interfaces with and is controlled by a supervisory terminal via supervisory interface 48, or alternatively it reads switches set by the user and drives indicators which are used to inform the user regarding status. A fourth function is the communication function. The microprocessor communicates with a remote microprocessor and resolves configuration differences or discrepencies which may be found, and informs the remote multiplexer of any diagnostic tests that may be in progress. The fifth general function is the diagnostic function which permits the microprocessor to periodically test the hardware and store the results. Unless further described herein, it should be assumed that the various microprocessor functions and implementations thereof are similar or identical to those already known in the art.

Figure 2:
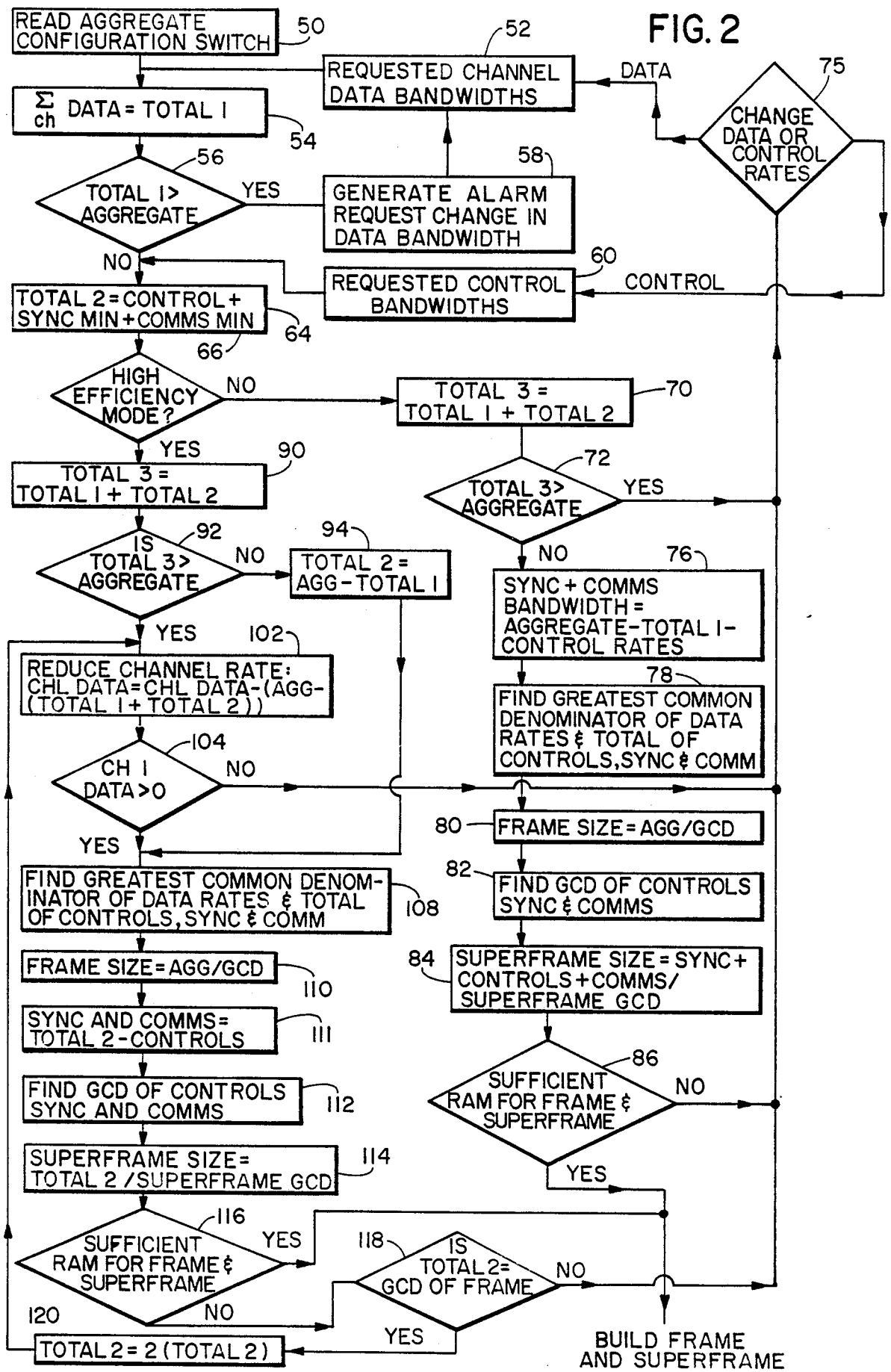
FIG. 2 is a flow chart illustrating the bandwidth setting function of a microprocessor which comprises part of the apparatus of the invention, and the bandwidth setting portion of the method invention.

Turning to FIG. 2, a flow chart illustrating the bandwidth setting function of the microprocessor 40 is seen. At 50 the microprocessor reads the aggregate configuration switch of the aggegate interface card 46 to determine the bit rate of the aggregate. Alternatively, the microprocessor may be instructed of the aggregate bit rate by the user via the supervisory interface 48. At 52, the microprocessor determines the requested data rates of the channels. The data rate determination may take the form of either reading switches of the channel interfaces 22, or being instructed by the user of the requested data rates. If the microprocessor is instructed by the user, the microprocessor, in conjunction with its control function, configures the channel interface to expect certain data rates.

Once the data rates are determined, the microprocessor 40 using its support circuitry 42 sums the requested channel data rates at 54 and stores the total (Total 1) in its own memory 44. The total sum is then compared to the aggregate rate at 56, and if the requested sum is greater than the aggregate, an error flag or alarm is generated, and the user is requested to change the requested bandwidth at 58. The user may alter the requested bandwidths by resetting switches or by communicating with the microprocessor via the supervisory interface. Once the total data rate is decreased below the aggregate rate, the microprocessor determines the requested control transmission rates for each of the channels at 60. Then, at 64 a second total is calculated by the microprocessor support 42. The second total equals the requested control total plus a fixed overhead which comprises a minimum bandwidth for intermultiplexer synchronization and communication.

At 66, the microprocessor determines whether the system is in a "high efficiency mode" which permits bandwidth to be stolen from the channel (e.g. when terminals or computers are the peripherals) as opposed to another mode (e.g. when modems are the peripherals) which does not permit the data bandwidths to be so altered. If none of the data bandwidths can be automatically altered, a third total (Total 3) which is the sum of the first and second totals is calculated at 70. The third total is compared at 72 to the aggregate rate, and if the third total exceeds the aggregate, the user is required at 75 to change the data or control rates either by assigning new values or by deleting channels or particular controls. If the data rates are changed at 52, the first, second and third totals are recalculated at 54, 64, and 70. If the control rates are changed at 60, the microprocessor recalculates the second total at 64 and the third total at 70. Regardless, a new determination is made at 72 as to whether the aggregate now equals or exceeds the third total. If it does not, the user is again requested to change the data or control rates at 75 until the aggregate can accommodate the requested rates.

Once it is determined at 72 that the aggregate is greater than the third total, the efficiency of the system is maximized by assigning all remaining bandwidth to overhead. Thus at 76, the synchronization and communication overhead bandwidths are set to equal or nearly equal the aggregate rate minus the channel data and control rates. Preferably, the sync and comms bandwidths are set such that their total plus the channel control rates will equal a rounded figure which easily divides into the aggregate rate. Then, at 78, the greatest common denominator (GCD) of the data rates and the total of the control rates and the assiged overhead is found and set to the frame rate. The frame size may then be determined at 80 by dividing the aggregate rate by the GCD. At 82, the greatest common denominator of the controls, and one-eighth of the synchronization and communication rates is found. The superframe size is then determined by dividing the control, sync and comms total by the superframe GCD. The superframe size is then added to the frame size determined at 80 and the total is compared at 86 to the RAM available for storing the frame and superframe. If sufficient RAM is not available, the data or control rates must be changed at 75 to result in a shortening of the frame or superframe. If sufficient RAM is available, the microprocessor may continue on to generate a frame and superframe.

If it is determined at 66 that the system is in the "high efficiency mode", bandwidth may be "stolen" from one of the data channels according to a technique and apparatus hereinafter described. In this manner, the user is permitted to assign non-standard bandwidths to channel controls, and the data bandwidth is adjusted to permit the system to function. Thus, at 90, a third total (Total 3) is calculated as the sum of the first and second totals. The third total is compared to the aggregate at 92 and if the third total does not exceed the aggregate, the remaining bandwidth is assigned at 94 to the non-data portions of the bandwidth. If the third total does exceed the aggregate, it is determined that bandwidth must be stolen from a data channel. Thus, at 102 the data rate of a channel is reduced by the amount of bandwidth needed (third total minus the aggregate). In the preferred embodiment, the bandwidth is stolen from the channel with the greatest data rate (e.g. channel 1). Then at 104, the data rate of the channel from which bandwidth has been stolen is compared to a preset rate (e.g. 0), and if the data rate exceeds the preset rate the procedure continues. Otherwise, the user is requested at 75 to change the data or control rates and the microprocessor is forced to proceed through the entire loop. Of course, those skilled in the art will recognize that the system requirements of box 104 can be set differently. Thus, the channel rate which has been reduced could be compared to a different fixed rate or to a predetermined constant (e.g. 0.5) times the original data rate of the channel having the largest bandwidth. Or, if desired, the channel from which bandwidth is taken may be other than the channel with the largest bandwidth. Yet another scheme would have data rates reduced proportionately for all channels in the high efficiency mode.

Figure 3:
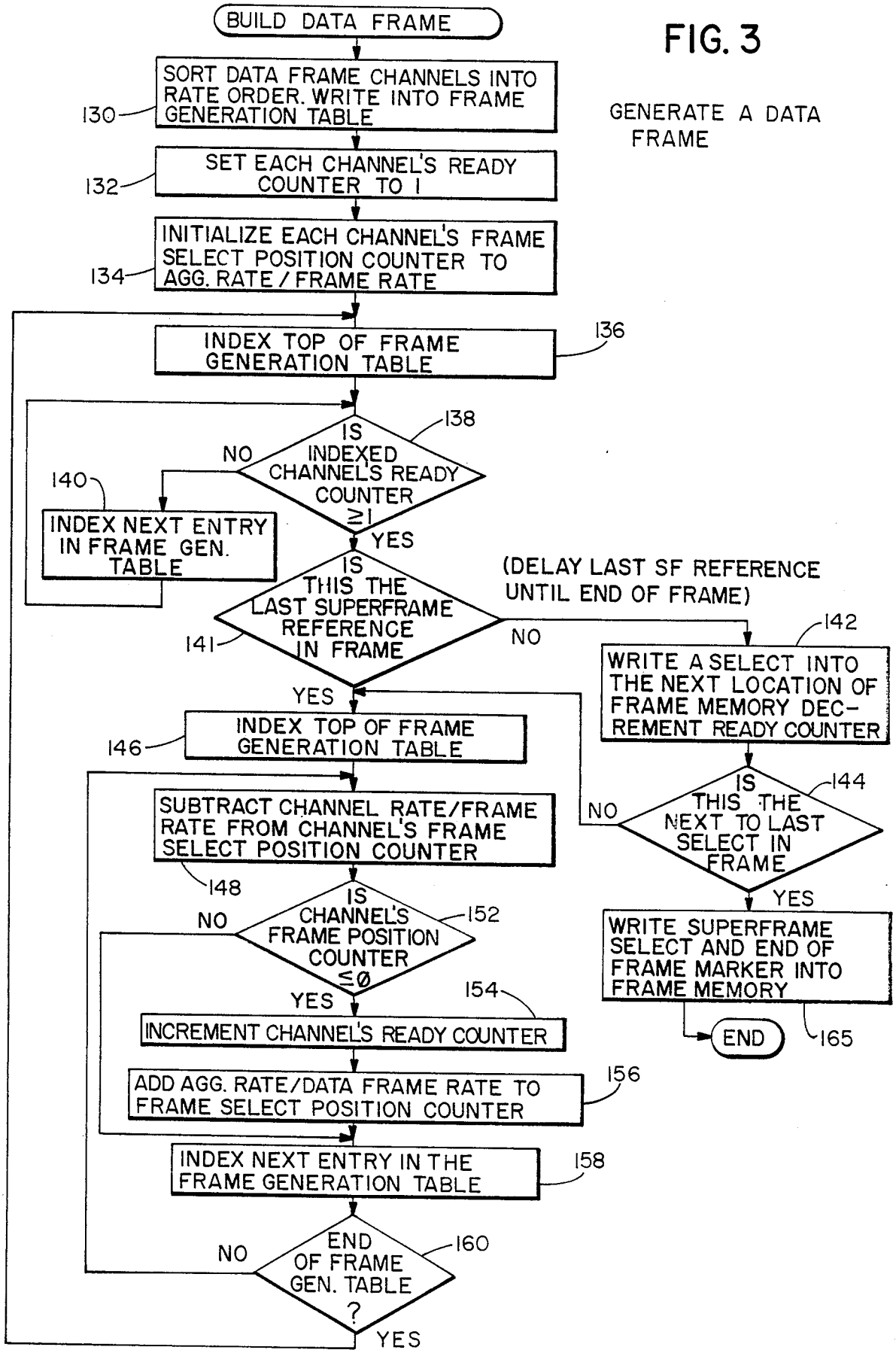
FIG. 3 is a flow chart illustrating the framing determination function of a microprocessor which comprises part of the apparatus of the invention, and the framing determination portion of the method invention.

Returning to FIG. 2, once the system requirements of 104 are met, the GCD of the data rates and the sum of the controls and overhead is found at 108. The frame size is then found at 110 by dividing the aggregate rate by the GCD for the frame. At 111, the efficiency of the system is maximized by assigning any free bandwidth to the synchronization and communications overhead, and at 112, the GCD of the controls, and one-eighth of the sync and comms requirements is found. The superframe size is then determined by dividing the second total by the superframe GCD at 114, and the total of the superframe and frame sizes is then compared at 116 to the space available in RAM. If sufficient memory is available, the microprocessor proceeds to generate the frame and superframe as shown in FIG. 3. If the RAM is not sufficient for building the frame and superframe, a determination is made at 118 as to whether the second total (non-data bandwidth) is the determining factor for the frame GCD. If the second total is not equal to the GCD, the microprocessor requires the user at 75 to change the requested rates, and the entire procedure is repeated. However, if the second total is equal to the GCD of the frame and is the only factor determining the GCD, the second total is doubled at 120, and the data bandwidth of the channel from which bandwidth was stolen is reduced again at 102. The doubling of the second total may be seen to have two functions in reducing required RAM. First, by doubling the GCD, the frame size is cut in half. Second, if the synchronization or communication bandwidth (one-eighth thereof) was the determining factor of the superframe, the GCD of the superframe will likewise be increased, thereby reducing the length of the superframe. It will also be appreciated that in doubling the second total, looping back to 102 and proceeding therefrom, the microprocessor will not be doubling the control rates but will be more than doubling the sync and comm rates, as all nonassigned bandwidth is given to sync and comms at 111.

Turning to FIG. 3, the method of generating a data frame is seen. First, at 130, the data channel rates are sorted by rate order. Then, at 132, a "ready counter" which indicates that a select for the channel may be inserted into the frame is set to one for each channel. A frame select position counter for each channel is initialized at 134 to equal the aggregate rate divided by the frame rate (GCD). With the ready counters set and the select position counters initialized, at 136, the top of the frame (the data channel with the highest rate) is indexed. The microprocessor then determines at 138 whether the ready counter of the indexed channel has a value greater than or equal to one. If not, the data channel with the next highest rate is indexed at 140 until a channel having a ready counter which will allow a select is found. Once such a channel is found at 138, a determination is made at 141 as to whether the ready counter belongs to the last superframe reference in the frame. If the ready counter belongs to the last superframe reference, the select is not written into the frame as the last superframe reference is preferably placed into the last location in the frame memory. Rather, the microprocessor proceeds to 146 and the loop following thereafter as will shortly be described.

If the ready counter is not the last superframe reference, at 142, a select for the indexed channel is written into the next available frame memory location, and the ready counter for the indexed channel is decremented. If the select is determined at 144 not to be the next to last select in the frame, the top of the frame generation table is indexed at 146. Then, for each channel (as steps 158 and 160 cause a loop to be formed), a value equal to the channel rate divided by the GCD is subtracted from each channel's select position counter at 148. Then, at 152, a determination is made as to whether the frame position counter for any particular channel has decreased to or below zero. If so, the channel's ready counter is incremented at 154, and a value equal to the aggregate divided by the data frame rate is added at 156 to the frame select position counter for that channel. Once a determination has been made at 158 and 160 that all the entries have been indexed, the microprocessor returns to 136, and the data channel with the highest rate having a ready counter with a value of one or more is indexed so that a select may be written into the frame. The loop as afore-described is then repeated until the last data select (next to last select) is written into the frame at 144. Then the last superframe select and end of frame marker are written into the frame at 165.

Turning to FIG. 4, a hypothetical frame and superframe built according to the teachings of the invention is seen. An aggregate of 38,400 bits/second was available. The frame frames data from seven peripherals having bit rates ranging from 9600 bits/sec to 1200 bits/sec, and control rates ranging from 50 bits/sec to 400 bits/sec. For purposes of illustration only, the lowest permissable intermultiplexer synchronization and communication rates were each set at 400 bits/sec. The peripherals were arranged by channel as follows:

| Channel # | Bit Rate | Control Rates by Control # |
|---|---|---|
| 1 | 9600 | C1 = 400 C2 = 200 C3 = 50 C4 = 50 |

| Channel # | Bit Rate | Control Rates by Control # |
|---|---|---|
| 2 | 9600 | C1 = 400 C2 = 100 C3 = 50 |
| 3 | 4800 | C1 = 100 C2 = 50 |
| 4 | 4800 | C1 = 50 |
| 5 | 4800 | C1 = 50 |
| 6 | 2400 | C1 = 50 |
| 7 | 1200 | C1 = 50 |

As will be readily seen, the total bandwidth of the seven channels (first total) is 37,200 bits/sec which is less than the aggregate bit rate. The combined total of the control rates and the overhead is 2400 bits/sec (second total). The sum of the two totals is 39,600 bits/sec (third total), which exceeds the aggregate bandwidth by 1200 bits/sec. Conveniently, the greatest common denominator of the data bit rates is 1200. Thus, the removal of a single select from one of the data channels will provide exactly the 1200 bits/sec needed.

In framing, it is seen that with a GCD of 1200 and an aggregate of 38,400 bits/sec, there will be thirty-two bits/frame (i.e. the select position counter of the channels are initially set to thirty-two). In accord with the invention, the channels were arranged with greatest bit rate first. The superframe was placed between channels six and seven. Then, the figure required by step 148 was determined by dividing 1200 into each channel baud rate (which also provides the number of selects required per frame for each data channel and the combined control/overhead "channel"). Also, because the aggregate rate is less than the requested data, controls and minimum overhead, the requested rate from one of the channels was decreased. Assuming that the peripheral attached to channel one was a modem, but that the peripheral attached to channel two was a terminal, one select was "stolen" from channel two so that the superframe selects could be accommodated. Thus, the actual rate of channel two was 8400 bits/sec, and the channel frame select position counter subtraction factor determined at 148 was seven for channel two.

Using the framing algorithm of FIG. 3, the microprocessor chose selects for placement into a frame depending upon the ready counter of the channel and the frame select position counter of the channel as outlined in FIG. 4. In FIG. 4, the status of a ready counter set to one is indicated by an underline of the frame select position counter value. No underline indicates that the ready counter is at zero. Thus, a frame was developed as shown in FIG. 4. Because the channels frame select position counter for each channel was initially set to be thirty-two at 132, and because eight was subtracted from that figure at 148 each time a select was written into the frame, it will be appreciated that a select for channel one appears every fourth select. While chanel two would have normally followed the same pattern if bandwidth had not been "stolen" from it, a deviation is seen to occur at the tenth select in the frame. It is seen that channel two has not reached a position counter below or equal to zero until after that tenth select, and therefore the select of channel two occurs out of position in the eleventh position. This may be contrasted to a frame which would be established if the superframe rate was half that which was assumed herein such that no bandwidth would be stolen from channel two.

A review of the data frame seen in FIG. 4 will also show that the correct amount of selects for each channel were evenly divided throughout the frame. In that vein, and in accord with steps 140, 144 and 156, the second superframe select which would normally been have selected earlier where the channel seven select is seen (the thirty-first slot), was delayed and placed into the last slot. In this manner a frame is provided which accommodates the requested control and overhead rates. All except one of the data rates were also kept intact.

After the frame has been set, the superframe must be built. The building of the superframe is carried out in almost an identical manner to the frame building. Thus, the superframe components are arranged in rate order and superframe component select position counters are initialized to forty-eight, since the GCD of the superframe is fifty, and the combined control and overhead rate is 2400 bits/sec. Then using the same channel ready counter and select position counter subtraction scheme, the superframe is built. Thus, the first control of peripheral (channel) one (C1,1) and the first control of peripheral two (C2,1) are inserted into the superframe. Then, the communications and synchronization selects are inserted, etc. As with the last superframe select in the frame, it will be appreciated that the last select of the superframe is especially set aside. Thus, the last select is reserved for a synchronization bit which is used to notify a remote multiplexer of a change in frames.

One difference between the manner of building the superframe and frame is the provision of the ability to build asymmetrical superframes. In other words, the provided manner of building the receive and transmit superframes permits the frames to be different. Thus, if it is desired to have control one of channel one of the transmit side appear at control two of channel one on the receive side, the user could send that information to the microprocessor 40 via the supervisory interface 48. The desired function could then be accomplished during framing of the receive frame by having the superframe select compared to a chart kept in memory such that wherever a select of control one of channel one appeared on the transmit side, it would be replaced by control two of channel one on the receive side. Those skilled in the art will appreciate that this asymmetric frame capability together with the ability of the provided multiplexer to read and write from all output controls, obviates the need for the external wiring (e.g. jumper plugs) of the prior art. It will also be appreciated that a similar technique can be employed in the frame (as opposed to the superframe) to achieve a cross-coupling of data channels.

Returning to FIG. 4, with the hypothetical data, control, sync and comms rates as provided above, the frame must repeat twenty-four times for each repetition of the superframe, as two selects for the superframe occur in each frame. Thus, the clocks which control the pointers which address the locations of the frame and superframe in the RAM must be set accordingly. The clocks for each of the data channels are also easily derived by phase locking to the aggregate and dividing down to produce the required clocks. However, in the hypothetical arrangement previously provided, while the nominal rate for channel two is set at 9600 bits/sec, the actual rate must be 8400 bits/sec, as 1200 bits/sec has been stolen for superframe use. Thus, a means for setting the average rate of the receive and transmit clocks of channel two equal to the nominal rate minus the stolen rate must be provided.

Turning to FIGS. 5 through 7, the means for setting the average rate of the receive and transmit clocks of the channels exactly equal to the requested channel rate minus the stolen rate is seen. The circuit of FIG. 5, which sets the receive clock of the channel (the transmit clock of the channel is preferably taken directly from the receive clock) and which is preferably located in each channel LSI 24, is activated by the microprocessor 40 when it is determined by the microprocessor during framing that bandwidth must be stolen from a channel. The circuit broadly comprises an up-down counter 200 connected to a frame clock 202 and a receive clock 230, the up-down counter counting up when a select for the channel is received from said frame, and counting down when clock pulses from said receive clock are received, and means 206 and 208 for reducing the rate of receive clock 230 by deleting a clock pulse from the divided down clock 205 when the counter 200 reaches a lower threshold.

More particularly, line RDAS3B is the receive data select line 202 which is used to clock data from the multiplexer into the receive data buffer. Pulses on line 202 cause the up-down counter 200 to count up as will be described with reference to FIG. 6. On the other hand, line DDC is the divided down clock line 205 which is used to generate the receive clock which is then used to clock data from the receive buffer to the peripheral. Pulses from the receive clock cause the up-down counter 200 to count down as will be described with reference to FIG. 6. The up-down coordinator circuit 220 is used to prevent clock pulses from lines 202 and 230 from clocking the up-down counter 200 simultaneously.

The up-down counter 200 is preferably a four-bit counter initially set to a value of eight. The output signal (LT4) 225 of the up-down counter is arranged to go high if the value in the up-down counter 200 is less than four, as will be described with reference to FIG. 7. With the output signal 225 being input into flip-flip 206, the output of flip-flop 206 goes low when signal 225 is high and thereby forces the output of AND gate 208 low. Since the output of AND gate 208 is the receive clock 230 (RCK2), a low output from AND gate 208 will cause the receive clock 230 to miss a pulse. As a result, information which is in a receive buffer will have to wait another pulse of the divide down clock 205 before it is clocked into the waiting peripheral. Reference may be had to copending patent application Ser. No. 06/876,229 filed 6/19/86 now U.S. Pat. No. 4,710,920, FIG. 2, to see the relationship of the divide down clock, and the transfer of data from the receive buffers to the peripherals. As indicated therein at box 100, the input pointer, which directs the slots in which the incoming data are to be placed in the buffers, is incremented by channel selects of the receive frame. Also, as indicated, the output pointer 102, which points to the buffer slots from which data is to be received by the terminal. If the receive frame is placing selects into particular buffers in a slower than expected manner due to the stealing of bandwidth from that channel, and the receive clock to the terminals is not slowed, the output pointers would catch up to the input pointers, and the system would shut down. Thus, the circuitry of the invention herein causes a reduction in the rate of the receive clock of the terminal, and the divided down clock 205 herein, is the same as the timing clock 104 and programmable divider 106 of the aforereferenced application Ser. No. 06/876,229 filed 6/19/86 now U.S. Pat. No. 4,710,920.

Turning to FIG. 6, the up-down coordinator circuit 220 is seen in detail with a timing diagram which helps explain its functioning. The up-down coordinator comprises two flip-flops 250 and 260, a combined flip-flop and two-to-one multiplexer 270, an inverter 272, a NAND gate 274, and two OR gates 276 and 278. The coordinator 220 has three clock inputs, receive clock 230 (RCK2) which clocks data from the receive buffer of the channel to the peripheral, a data select 202 (RDAS3B) which clocks data from the multiplexer into the receive data buffer, and a high speed clock 282 (SCKD2), the first two being synchronized to the latter input. Input 290 (RB) is used to reset the flip-flops upon power-up. The outputs of the coordinator are a count down signal 280 (CD) and a count up signal 285 (CU). While positive transitions may occur on both the receive clock 280 and the data select input 202 simultaneously, with the count up signal following the data select and the count down signal following the receive clock, positive transitions are not permitted simultaneously on CU and CD as will be described hereinafter.

Referring to the timing diagram of FIG. 6, it is seen that the receive clock 230 which results from the AND logic output of the opposite of the divided down clock and the not Q output of flip-flop 206, is preferably a fifty percent duty cycle clock. One the other hand, the receive data select line 202 which is used to clock data from the multiplexer into the receive data buffer, is normally high but goes low at its pulse repetition frequency for one cycle of the high speed clock 282. Flip-flop 260 functions to delay the select clock 202 by one cycle of the high speed clock 282. Thus, the not Q (Q bar) output of flip-flop 260 is seen to go low for one cycle of high speed clock 282 one cycle after the select clock 202 has gone low. When the not Q output of flip-flop 260 is low, and the high speed clock 282 goes low, the output of OR gate 278 goes low, and a count up pulse 285 appears for half a cycle of the high speed clock.

Flip-flop 270 functions in much the same manner as flip-flop 260. In most cases of operation where a receive clock and a select clock transition are not received simultaneously, the select line 202 is inactive (high) when a receive clock pulse is received. When select line 202 is high, the SEL input into flip-flop 270 is low, and the Q output delays the receive clock signal 230 by one cycle of the high speed clock 282. The Q output is then fed into flip-flop 250 and NAND gate 274 which together act as a differentiator. Thus, a positive transition on the Q output of flip-flop 270 causes the output of NAND gate 274 to go low for one cycle of the high speed clock 282. The output of NAND gate 274 is then gated with the high speed clock 282 by OR gate 276, and a count down pulse 280 appears for half a cycle of the high speed clock. Where transitions on the receive and select clocks 230 and 202 are received simultaneously (as seen in the second half of the timing diagram of FIG. 6), the SEL input into flip-flop 270 is high and causes the Q output to be maintained at its present state. Thus, the Q output of flip-flop 270 is delayed by an extra cycle of the high speed clock and the output of NAND gate 274 and OR gate 276 are likewise delayed. As a result, the count down pulse 280 is also delayed by one cycle, and the correct operation of up-down counter 200 is assured.

Turning to FIG. 7, the up-down counter 200 is seen in detail. The up-down counter 200 consists of four flip-flops 300, 310, 320, 330, six two-input AND gates 340, 342, 344, 346, 348, 350, one inverter 352, one three-input NAND gate 354, and six NOR gates 356, 358, 360, 362, 364, 366. The state of the Q outputs of the four flip-flops represents a four-bit word which is the count, with flip-flop 330 representing the MSB of the word, and flip-flop 300 representing the LSB. In the start-up mode, the enable sub-rate (ENSR) input 235 to the flip-flops is low, causing flip-flops 300, 310, and 320 to clear and causing the Q output of flip-flop 330 to be set (not Q is low). The resulting four bit binary word is 1000 (eight in decimal), which is the initial count as aforedescribed. The four bit count, however, is not the output of the counter. Rather, a less than four (LT4) signal 225 is derived from the count, and is only positive when the not Q outputs to AND gate 350 from flip-flops 320 and 330 are both positive. Thus, the LT4 signal 225 only goes high when the Q outputs of the most significant bits are low such that the count is less than four. As described above, when the count drops below four and the LT4 signal goes high, one pulse of the receive clock 230 is deleted.

For counting up and down, the up-down counter receives either a CU signal or a CD signal from the up-down coordinator 220 as previously discussed. The positive transition of both clocks is used to change the count, and as previously discussed, the positive transitions are not permitted to occur simultaneously, but rather, one clock must be high when the other goes positive. Thus, as seen in FIG. 7, when either the CU or CD pulse is received by the first flip-flop 300, it is passed by AND gate 340, and the Q output changes value. Flip-flop 310, which produces the next bit of the count toggles depending on the state of the first flip-flop. Thus, in the situation where flip-flop 300 has a low Q output and in the absence of either a CU or CD signal, both inputs into NOR gate 356 are high, as the normal state of CU is high, and the output of NOR gate 356 is low. At the same time, one input (CD) into NOR gate 358 is high, causing the output of NOR gate 358 to be low. With low outputs from NOR gates 356 and 358, the output of NOR gate 360 is high. If a CU signal appears, the CU signal will not cause the output of NOR gate 356 to change, as the not Q output of flip-flop 300 is still high. Thus, the output of NOR gate 360 will not change, and flip-flop 310 will not toggle. However, if a CD signal appears (CD goes low), both inputs into the NOR gate 358 will be low, causing the output of NOR gate 358 to go high. With a high input into NOR gate 360, the output of the NOR gate 360 will go low, thereby toggling flip-flop 310. In sum, then, a CU signal will not toggle flip-flop 310 when the Q output of flip-flop 300 is low, but, a CD signal will toggle the flip-flop 310 in the same circumstance. Those skilled in the art will recognize that for reasons of symmetry, if the Q output of flip-flop 300 is high, a CD signal will not cause flip-flop 310 to toggle while a CU signal will cause such toggling. Those skilled in the art will also appreciate that flip-flops 320 and 330 and the circuitry associated therewith perform in similar manner, with flip-flop 320 depending on the status of flip-flops 300 and 310, and flip-flip 330 depending on the status of flip-flops 300, 310 and 320.

Returning to FIGS. 2 and 3, the method invention for efficiently allocating bandwidth to data, control, synchronization and intermultiplexer communication information, and for providing flexible data rates and control rates with high utilization efficiency is seen. As seen at 50 and 52, the requested data transmission rates for each of the data channels and the aggregate line are determined. At 60, the requested control transmission rates for each control of the data channels is determined. For the high efficiency mode where bandwidth may be stolen from a data channel, the total of the requested data transmission rates is summed to produce a first total, the total of the requested control transmission rates and the overhead signal rates are summed to produce a second total, and the first and second totals are summed to produce a third total at 54, 64, and 90 respectively. At 90, a determination is made as to whether the third total exceeds the aggregate line transmission rate.

If the aggregate exceeds the third total, the sync and comms rates are increased at 94 and 111 to provide an efficient use of the available bandwidth. If the third total exceeds the aggregate by a certain amount, a channel data rate must be reduced at 102 by that amount, provided that system requirements such as set forth at 104 are met. Once all the data rates, control rates and sync and comms rates are accommodated, the best mode of the method requires that a determination be made as to whether sufficient RAM is available to store the frame and superframe, the sizes of which had been previously determined. If sufficient RAM is not available, the second total is doubled, the data rate of the channel from which bandwidth had already been stolen is again reduced (this time by an amount equal to one-half the new second total), and if system requirements are met, an evaluation of frame and superframe size as compared to RAM space available is undertaken.

Once it is determined that the available RAM is sufficient to store the frame and superframe, the frame and superframe are built in almost an identical manner. For the frame, the channel data rates and the second total are sorted into rate order. The selects for each channel and the superframe are generated by an algorithm which initializes each channel select position counter to the aggregate rate divided by the frame rate, decrements each position counter by the particular channel rate divided by the frame rate each time a select is or could be (as in the case of the last superframe select) placed in the frame, and adds an amount equal to the aggregate rate divided by the frame rate each time the position counter reaches or falls below zero. Selects are chosen by giving priority to the channel with the highest rate if its channel ready counter is set to one. The channel ready counters are all initially set to one. After a select is chosen for the channel, the channel's ready counter is decremented by one. The channel's ready counter is increased each time the channel's position counter reaches or falls below zero. The last superframe select is preferably written into the last slot of the frame.

There has been described and illustrated herein apparatuses and methods for efficiently allocating bandwidth to channel data and controls and multiplexer overhead information and for providing flexible data and control rates with high utilization efficiency. While particular embodiments of the invention have been described, it is not intended that the invention be limited thereby, as it is intended that the invention be broad in scope and that the specifications be read likewise. Thus, while the preferred invention was described in terms of supporting up to sixteen peripherals and having RAMs providing eight bit codes, it should be appreciated that the number of peripherals (channels) may be changed as desired as may the number of bits in the coding as well as the coding itself used in the RAMs. Likewise, while particular algorithms for "stealing" data bandwidth from a channel and for placing selects in a frame were provided, those skilled in the art will appreciate that many changes may be made to those algorithms and many equivalents provided which should be considered within the scope of the invention. Thus, for example, instead of doubling the second total at step 120 of FIG. 2, an amount of bandwidth could be added to the previous second total. In this manner, even if the GCD was dictated by the second total in conjunction with another data rate, the GCD might be increased if the other data rate was not equal to the GCD. Also, while the invention provided for the stealing of the bandwidth prior to framing, those skilled in the art will appreciate that all of the channel data selects could be inserted into the frame prior to the insertion of the supeframe selects. Then, if the required slots were unavailable for the superframe selects, bandwidth could be "stolen" by removing a select of a data channel and replacing it with a superframe select. Such a technique should be considered as literally decreasing the data rate allocated to a data channel.

It will also be appreciated that various terms of art were used broadly and interchangeably throughout the specification. Thus, "bandwidth" should be equated with "data rate" which itself equates with "bit rate". Likewise, the terms "peripherals" and "channels" were used interchangeably. Further, while "information" was primarily used to indicate control information or multiplexer overhead, the term "data" refers to channel data as well as other information. However, neither term is intended to be limiting in nature.

Further, it will be appreciated that while only brief note was made of the possibility of rounding off the second total such that the GCD of the data rates and second total will not be too small, those skilled in the art will recognize that such rounding off may be required such that the frame will fit in the available space in the RAM. Thus, if desired, sync and comms rates, as well as data rates and control rates may be limited to prespecified "allowable" rates. In that regard, if the aggregate bandwidth exceeds the requested data and control bandwidths, and the sync and comms bandwidth is expanded as in FIG. 2, box 111, the sync and comms bandwidth may not be exactly set to the second total minus the controls bandwidth. Rather, because the second total minus the controls might not be an allowable bandwidth, the sync and comms bandwidth would be set to an allowable bandwidth directly below the available bandwidth. The remainder of the bandwidth would be assigned to waste bandwidth.

Yet further it will be appreciated that various of the means and steps of the invention may be combined or separated without escaping the scope of the invention. Thus, a single running total rather than first and second totals may be kept to help determine whether bandwidth must be stolen from a channel. On the other end, a third total which is the sum of the first and second totals may be conveniently used for comparison means with the aggregate rate.

Finally, while the specifications herein only refer to a single frame being stored in a RAM, those skilled in the art will appreciate that the building of a second frame while a first frame is running is known in the art. Indeed, the multiplexer herein not only provides for such a situation, but provides many preset frames stored in the frame RAMs to account for common data rate and control rate situations. Therefore, it will be apparent to those skilled in the art that other changes and modifications may be made to the invention as described in the specification without departing from the spirit and scope of the invention as so claimed.

We claim:

1. In a time division multiplexer which multiplexes for transmission over and for receipt from at least one aggregate line in accord with at least one frame data and control information from a plurality of channels and multiplexer overhead information, an apparatus for determining the data rates to be allocated to the data and controls of said channels and to the said multiplexer overhead, and for permitting said data channels to run at said allocated data rates, said apparatus comprising:
   (a) means for determining the requested data transmission rates for each of said data channels and said aggregate line;
   (b) means for determining the requested control transmission rates for each of said data channels;
   (c) summation means for summing the total of said requested data transmission rates to produce a first total, for summing the total of said requested control transmission rates and said overhead signal rates to produce a second total, and for summing said first and second totals;
   (d) comparison means for determining whether the sum of said first and second totals exceeds the determined transmission rate of said aggregate line;
   (e) means for decreasing the data rate allocated to at least one data channel thereby changing said first total, to ensure that said aggregate line transmission rate is at least equal to the sum of said first and second totals; and
   (f) means for setting the average rate of one of a group of clocks comprising a transmit and a receive clock of at least one of said channels equal to the requested data transmission rates of that channels decreased by rates dictated by said means for decreasing the allocated data rate.

2. An apparatus according to claim 1, wherein:
said means for decreasing the data rate allocated to at least one data channel reduces the data rate by an amount substantially equal to the aggregate rate minus the sum of said first total and the said second total.

3. An apparatus according to claim 2, wherein:
said means for decreasing the data rate allocated to at least one data channel reduces the data rate of a channel having the largest data rate which permits a reduction in its rate.

4. An apparatus according to claim 2, wherein:
said means for decreasing the data rate allocated to at least one data channel reduces the data rates of all the channels permitting a reduction in their rate in a pro rata manner.

5. An apparatus according to claim 1, further comprising:
   (g) memory means; and
   (h) means for writing selects for channel data and for a superframe comprising said control and multiplexer overhead information into said memory means to create a frame when said aggregate line transmission rate is at least equal to the sum of said first and second totals, wherein the number of selects for data from each of said channels relates to said requested data rates minus the rates dictated by said means for decreasing data rates.

6. An apparatus according to claim 5, further comprising:

(i) means for determining a greatest common denominator of said requested data transmission rates decreased by rates dictated by said decreasing means for each of said data channels and said second total of the sum of the requested control transmission rates and overhead rates, wherein said greatest common denominator is a frame rate of said frame.

7. An apparatus according to claim 6, wherein:
said means for writing selects into said memory means to create a frame includes:
(1) channel select position counters for each of said data channels and for said second total;
(2) channel ready counters for each of said data channels and for said second total;
(3) means for initializing said channel select position counters to a value equal to said aggregate rate divided by said frame rate;
(4) means for determining each position counter of a channel by the channel rate divided by said frame rate each time a select is capable of being placed in said frame;
(5) means for incrementing each of said position counters by said value equal to said aggregate rate divided by said frame rate when said position counter value is less than one;
(6) means for initializing said channel ready counters to a value of one;
(7) means for decrementing said channel ready counter of a channel when a select is chosen for that channel;
(8) means for incrementing said channel ready counter of a channel by one when said channel position counter value for that channel is less than one;
(9) means for placing said data channels and said second total in rate order; and
(10) means for choosing the order of selects for said data channel and said second total as a function of the place of said data channel and said second total in rate order, and the value of said channel ready counters.

8. An apparatus according to claim 6, wherein said overhead comprises multiplexer synchronization and multiplexer communication information, further comprising:
(j) means for determining the greatest common denominator of said control rates and one eighth of each of said multiplexer synchronization and multiplexer communication information;
(k) means for dividing said aggregate rate by the greatest common denominator determined at (i) to provide a frame size;
(l) means for dividing said second total by said greatest common denominator determined at (j) to provide a superframe size;
(m) means for adding said frame and superframe sizes to provide a required memory size, and comprising said required memory size to the size of memory available in said memory means for said frame and superframe; and
(n) means for increasing said second total if said required memory size exceeds said memory available, wherein said means for decreasing the data rate allocated to at least one data channel further decreases the data rate allocated to at least one channel if said second total is increased.

9. An apparatus according to claim 8, further comprising:

means for allocating additional bandwidth to said overhead such that said overhead bandwidth substantially equals said increased second total, minus said requested control rates.

10. An apparatus according to claim 5, wherein:
said means for setting the average rate of one of a group of clocks comprises:
(1) an up-down counter controlled by said frame and said one of a group of clocks, the up-down counter counting up when a select for the channel is received from said frame, and counting down when clock pulses from said one of a group of clocks are received; and
(2) means for reducing the clock rate of a channel whose data rate has been decreased by said decreasing means (f) but whose clock rate is set equal to the requested data rate when said up-down counter reaches a lower threshold.

11. An apparatus according to claim 10, wherein:
said up-down counter is initially set to a valuae of eight, and said means for reducing the rate of one of a group of clocks reduces said rate when the value of said counter decreases below a value of four.

12. An apparatus according to claim 10, wherein:
said means for reducing the clock rate of a channel whose clock rate is equal to the requested data rate but whose data rate has been decreased by said decreasing means (f), comprises:
a flip-flop having the output of said up-down counter and a divided down clock equal to said requested data rate as inputs;
an AND gate having the not Q output of said flip-flop and a not divided down clock as inputs, wherein the output of said AND gate is said one of a group of clocks.

13. An apparatus according to claim 12, wherein:
said one of a group of clocks is said receive clock; and said transmit clock is set equal to said receive clock.

14. An apparatus according to claim 12, wherein:
said means for reducing the clock rate of a channel whose clock rate is set equal to the requested data rate but whose data rate has been decreased by said decreasing means (f), further comprises:
an up-down coordinator which prevents a select from said frame and a clock pulse from said one of a group of clocks from clocking said up-down counter simultaneously, wherein the inputs into said up-down coordinator include the output from said AND gate, a high speed clock, and selects for the channel sent by said frame, and wherein the outputs of said up-down coordinator are a count down pulse and a count up pulse which are both fed to the input of said up-down counter.

15. In a time division multiplexer which multiplexes in accord with at least one frame for transmission over and for receipt from at least one aggregate line data and control information from a plurality of channels and multiplexer overhead information, wherein a channel rate is decreased to a rate other than a rate originally assigned to it, an apparatus for setting the average rate of one of a group of clocks comprising a channel receive clock and a channel transmit clock equal to said rate other than the assigned rate, said apparatus comprising:
(a) an up-down counter controlled by said frame and said one of a group of clocks, the up-down counter counting up when a select for the channel is received from said frame, and counting down when clock pulses from said one of a group of clocks are received; and (b) means, when said up-down counter reaches a lower threshold, for reducing the clock rate of a channel whose data rate has been decreased to a rate other than was originally assigned to it but whose clock rate is set equal to the requested data rate.

16. An apparatus according to claim 15, wherein:
said means for reducing the clock rate of a channel comprises a flip-flop having the output of said up-down counter and a divided down clock equal to said originally assigned data rate as inputs, and an AND gate having the not Q output of said flip-flop and a not divided down clock as inputs, wherein the output of said AND gate is said one of a group of clocks.

17. An apparatus according to claim 16, wherein:
said one of a group of clocks is said channel receive clock; and
said channel transmit clock is set equal to said channel receive clock.

18. An apparatus according to claim 17, wherein:
said means for reducing the clock rate of a channel further comprises an up-down coordinator which prevents a select from said frame and a clock pulse from said one of a group of clocks from clocking said up-down counter simultaneously, wherein the inputs into said up-down coordinator include the output from said AND gate, a high speed clock, and selects for the channel sent by said frame, and wherein the outputs of said up-down coordinator are a count down pulse and a count up pulse which are both fed to the input of said up-down counter.

19. An apparatus according to claim 18, wherein:
said up-down counter comprises four flip-flops and associated logic circuitry, the Q outputs of said four flip-flops providing a four bit value initially set to a value of eight; and
said means for reducing the rate of one of a group of clocks reduces said rate when the value of said counter decreases below a value of four.

20. An apparatus according to claim 19, wherein:
said associated logic circuitry includes an AND gate with the not Q outputs of the two most significant flip-flops of said four flip-flops as inputs, such that said rate of one of a group of clocks is reduced when the logical AND of the not Q outputs of the two most significant flip-flops is positive.

21. In a time division multiplexer which multiplexes for transmission over and for receipt from at least one aggregate line in accord with at least one frame, data and control information from a plurality of channels and multiplexer overhead information, an method for determining the data rates to be allocated to the data and controls of said channels and to the said multiplexer overhead, and for permitting said data channels to run at said allocated data rates, said method comprising:
(a) determining the requested data transmission rates for each of said data channels and said aggregate line;
(b) determining the requested control transmission rates for each of said data channels;
(c) summing the total of said requested data transmission rates to produce a first total;
(d) summing the total of said requested control transmission rates and said overhead signal rates to produce a second total;
(e) determining whether the sum of said first and second totals exceeds said aggregate line transmission rate;
(f) decreasing, for at least one data channel, the data rate allocated to said at least one data channel if said sum of said first and second totals exceeds said aggregate line transmission rate, thereby changing said first total, until said aggregate line transmission rate is at least equal to said sum of said first and second totals;
(g) setting the average rate of one of a group of clocks comprising a transmit and a receive clock of at least one of said channels equal to the determined requested data transmission rates of that channel decreased by rate dictated by said step (f).

22. A method according to claim 21, wherein:
said decreasing the data rate allocated to at least one data channel in accord with step (f) reduces the data rate by an amount equal to the aggregate rate minus the sum of said first total and said second total.

23. A method according to claim 22, further comprising:
reducing the data rate of a channel having the largest data rate which permits a reduction in its rate, in accord with step (f).

24. A method according to claim 22, further comprising:
reducing in a pro rata manner the data rates of all the channels permitting a reduction in their rate, in accord with step (f).

25. A method according to claim 22, further comprising:
(g) writing selects for channel data and for a superframe comprising said control and multiplexer overhead information into a memory means to create a frame when said aggregate line transmission rate is at least equal to the sum of said first and second totals, wherein the number of selects for data from each of said channels relates to said requested data rates minus the rates dictated by step (f).

26. A method according to claim 25, further comprising:
(h) determining a greatest common denominator of said requested data transmission rates decreased by rates dictated by said step (f) for each of said data channels and said second total of the sum of the requested control transmission rates and overhead rates, wherein said greatest common denominator is a frame rate of said frame, and wherein said writing step (g) includes:
(1) providing channel select position counters for each of said data channels and for said second total;
(2) providing channel ready counters for each of said data channels and for said second total;
(3) initializing said channel select position counters to a value equal to said aggregate rate divided by said frame rate;
(4) decrementing each position counter of a channel by the channel rate divided by said frame rate each time a select is capable of being placed in said frame;
(5) incrementing each of said position counters by said value equal to said aggregate rate divided by said frame rate when said position counter value is less than one;

(6) initializing said channel ready counters to a value of one;

(7) decrementing said channel ready counter of a channel when a select is chosen for that channel;

(8) incrementing said channel ready counter of a channel by one when said channel position counter value for that channel is less than one;

(9) placing said data channels and said second total in rate order; and

(10) choosing the order of selects for said data channel and said second total as a function of the place of said data channel and said second total in rate order, and the value of said channel ready counters.

27. A method according to claim 26, wherein said overhead comprises multiplexer synchronization and multiplexer communication information, further comprising:

(i) determining the greatest common denominator of said control rates and one eighth of each of said multiplexer synchronization and multiplexer communication information;

(j) dividing said aggregate rate by the greatest common denominator determined at (h) to provide a frame size;

(k) dividing said second total by said greatest common denominator determined at (i) to provide a superframe size;

(l) adding said frame and superframe sizes to provide a required memory size, and comparing said required memory size to the size of memory available in said memory means for said frame and superframe; and (m) increasing said second total if said required memory size exceeds said memory available, wherein said means for decreasing the data rate allocated to at least one data channel further decreases the data rate allocated to at least one channel if said second total is increased.

28. A method according to claim 27, further comprising:

allocating additional bandwidth to said overhead such that said overhead bandwidth substantially equals said increased second total minus said requested control rates.

* * * * *